Jan. 3, 1928.
J. M. SPITZGLASS
ORIFICE PLATE
Filed May 20, 1922
1,654,559
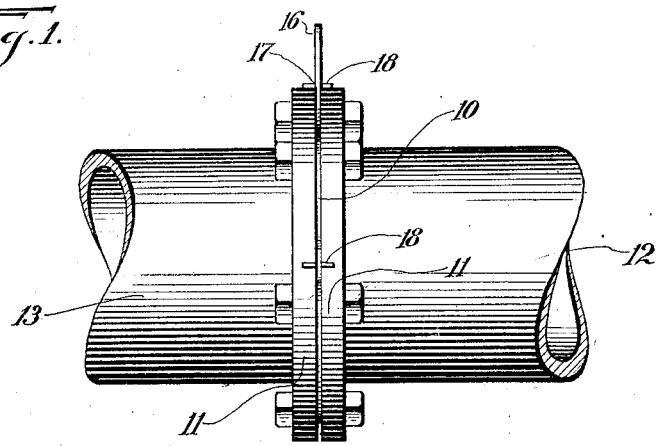
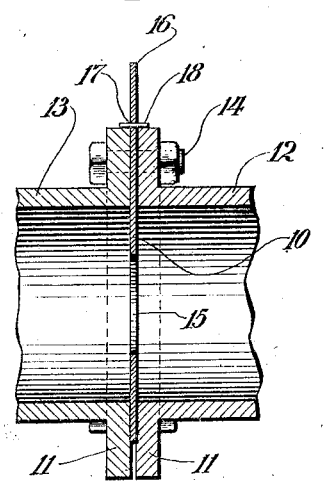
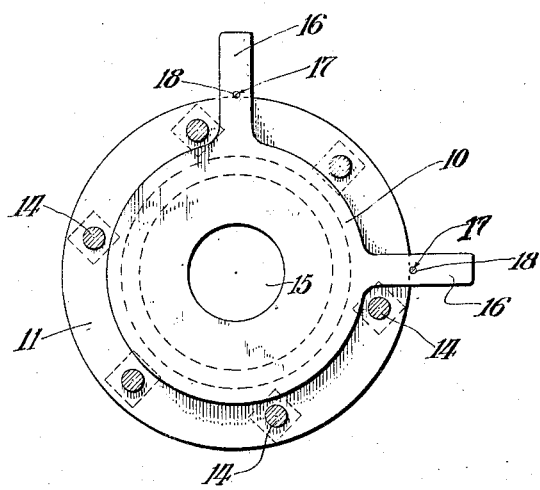
Inventor:
Jacob M. Spitzglass
By Nissen & Craw
Attys.

Patented Jan. 3, 1928.

1,654,559

UNITED STATES PATENT OFFICE.

JACOB M. SPITZGLASS, OF CHICAGO, ILLINOIS, ASSIGNOR TO REPUBLIC FLOW METERS COMPANY, OF CHICAGO, ILLINOIS, A CORPORATION OF ILLINOIS.

ORIFICE PLATE.

Application filed May 20, 1922. Serial No. 562,312.

This invention relates to devices for providing restricted orifices in pipes for the flow of fluids to be used particularly in connection with means for measuring or indicating the rate of flow of fluids in the pipes.

The invention has for its object the provision of a device of the class named which shall be of improved construction and operation and convenient to install.

The invention is exemplified in the combination and arrangement of parts shown in the accompanying drawing and described in the following specification, and it is more particularly pointed out in the appended claims.

In the drawing,

Fig. 1 is an elevation of a pipe coupling having one embodiment of the present invention applied thereto.

Fig. 2 is a longitudinal section of the coupling shown in Fig. 1; and

Fig. 3 is a transverse section of the coupling.

For the purpose of providing a differential pressure in the conduit by means of which the rate of flow of fluid in said conduit may be measured, it is a common practice to insert an orifice plate in the conduit having a restricted opening therethrough, so that a differential pressure will be produced on opposite sides of said plate.

In the present invention such an orifice is provided by means of a flat disk having a central opening therein, the disk being so constructed that it may be inserted between the abutting ends of pipe sections. Such a disk is designated by the numeral 10 in the drawing and may be inserted between the coupling flanges 11 formed at the ends of two pipe sections 12 and 13. Bolts 14 are commonly provided for connecting the flanges 11 of the two pipe sections to join the sections. The plate 10 has an orifice 15 at the central portion thereof of less diameter than the internal diameter of the conduit. The outside diameter of the disk is sufficient to permit the disk to be clamped between the abutting ends of the pipe sections when the connecting bolts 14 are tightened. To insert the orifice plate the nuts on the bolts 14 are loosened and a sufficient number of the bolts removed to permit the plate to be inserted edgewise between the ends of the pipes. In order that the rate of flow indicators controlled by the orifice shall properly operate it is important that the openings 15 shall be arranged concentric with the interior of the conduit. To provide for the proper centering of the orifice the disk 10 is provided with radially extending arms 16 having perforations 17 therein, which may receive stop pins 18 for limiting the entrance of the disk into the space between the ends of the pipes and for properly centering the orifice 15. The openings 17 are accurately positioned in the arms 16, so that when the pins 18 engage the outer periphery of the flanges 11 the orifice 15 will be properly centered. The radial distances of the openings 17 from the center of the disk 10 will vary for pipes of different sizes, and tables may be provided showing the proper distance of the openings from the periphery of the orifice 15 for the various standard sizes of pipes. Separate disks may be provided for pipes of different sizes, or each disk may be provided with differently spaced openings 17 to correspond to the different sizes of pipes.

In installing an orifice plate, it will only be necessary for the workman to ascertain the diameter of the pipe and select the disk having the opening 17 properly spaced for that diameter. The disks may then be inserted between the ends of the pipes until the pins 18 in the openings 17 engage the periphery of the flanges. The workman will then know that the disk is properly centered, and the bolts 14 may be clamped into place.

I claim:

1. An orifice plate for conduits having an opening therethrough and having a plurality of circumferentially spaced arms extending radially from said plate and angularly disposed relative to each other to facilitate the proper locating of the orifice in said plate relative to the conduit in which said plate is installed.

2. The combination with pipe sections having opposed ends, of a perforated disk interposed between said ends and a plurality of circumferentially spaced, radial members on said disk extending outwardly therefrom in angular relation to each other to positions outside of said pipe sections to enable said disk to be properly located between said pipe sections, said members having means for engaging said pipe sections to determine the radial position of said disc relative to said pipe sections.

3. The combination with pipe sections having opposed ends and circumferential flanges on said ends, of an orifice disk having an opening therethrough and arranged to be interposed between the opposed ends of said sections, said disk having outwardly extending arms thereon disposed at an angle to each other, and means on said arms for registration with the periphery of said flanges to facilitate centering of said orifice disc relative to said pipe sections.

4. The combination with a pipe section having opposed ends and peripheral flanges thereon, of an orifice disk having a central opening therein and arranged to be interposed between the opposed ends of said sections, radially extending arms on said disk disposed at an angle to each other and projections on said arms at predetermined distances from said orifice and in position to engage the periphery of said flanges so that when said projections are in engagement with said periphery the orifice in said disk will be properly located relative to the opening in said pipe sections.

In testimony whereof I have signed my name to this specification on this 16th day of May, A. D. 1922.

JACOB M. SPITZGLASS.